(12) United States Patent
Yokoyama et al.

(10) Patent No.: US 6,844,812 B2
(45) Date of Patent: Jan. 18, 2005

(54) VEHICULAR BRAKE WARNING APPARATUS ISSUING WARNING WHEN TARGET DECELERATION DIFFERS FROM ACTUAL DECELERATION

(75) Inventors: Takahisa Yokoyama, Anjo (JP); Takayuki Takeshita, Anjo (JP); Haruo Arakawa, Toyota (JP)

(73) Assignee: Advics Co., Ltd., Kariya (JP)

( * ) Notice: Subject to any disclaimer, the term of this patent is extended or adjusted under 35 U.S.C. 154(b) by 44 days.

(21) Appl. No.: 10/602,817

(22) Filed: Jun. 25, 2003

(65) Prior Publication Data

US 2004/0046652 A1 Mar. 11, 2004

(30) Foreign Application Priority Data

Sep. 4, 2002 (JP) .......................................... 2002-258864

(51) Int. Cl.[7] .................................................. B60Q 1/00
(52) U.S. Cl. ........................ 340/453; 340/438; 340/441; 340/467; 303/171; 303/183; 701/70; 701/96
(58) Field of Search ................................ 340/453, 454, 340/438, 441, 435, 467, 479, 691.2, 691.3; 180/197, 170–172; 303/171, 183, 185, 1, 121; 701/70, 96, 79, 80

(56) References Cited

U.S. PATENT DOCUMENTS

| | | | | |
|---|---|---|---|---|
| 6,131,063 A | * | 10/2000 | Seki et al. .................... | 701/70 |
| 6,292,753 B1 | * | 9/2001 | Sugimoto et al. ........... | 701/301 |
| 6,429,788 B2 | * | 8/2002 | Matsumoto et al. ........ | 340/901 |
| 6,545,438 B1 | * | 4/2003 | Mays, II ..................... | 318/254 |
| 6,572,200 B2 | * | 6/2003 | Soga et al. .................... | 303/3 |
| 6,724,300 B2 | * | 4/2004 | Miyakoshi et al. ......... | 340/435 |

FOREIGN PATENT DOCUMENTS

| | | |
|---|---|---|
| JP | A-08-072692 | 3/1996 |
| JP | A-09-254757 | 9/1997 |

* cited by examiner

*Primary Examiner*—Davetta W. Goins
(74) *Attorney, Agent, or Firm*—Posz & Bethards, PLC

(57) ABSTRACT

A brake operation amount detection device detects an operation amount of a brake pedal, and a target deceleration computation device computes a target deceleration corresponding to an operation amount that the driver intends to achieve. Further, an actual deceleration calculation device calculates an actual deceleration. A deviation between the target deceleration and the actual deceleration is obtained as a difference level, and a warning issuing device generates a sound having a volume that increases in accordance with the magnitude of the difference level. Accordingly, in the case that the brake does not act, contrary to the driver's expectation, even when the driver presses down the brake pedal, the driver can recognize a degree of difference from the driver's braking intention, based on the magnitude of the sound. Therefore, the driver does not feel a sense of danger or fear.

7 Claims, 3 Drawing Sheets

VEHICULAR BRAKE WARNING APPARATUS ISSUING WARNING WHEN TARGET DECELERATION DIFFERS FROM ACTUAL DECELERATION

CROSS REFERENCE TO RELATED APPLICATION

This application is based upon and claims the benefit of Japanese Patent Applications No. 2002-258864 filed on Sep. 4, 2002, the content of which are incorporated herein by reference.

FIELD OF THE INVENTION

The present invention relates to a vehicular brake warning apparatus issuing warning to a driver in accordance with a difference between a target deceleration that the driver intends to obtain and an actual deceleration, that is, a degree of difference.

RELATED ART OF THE INVENTION

Conventional art is disclosed (for example, in Japanese Patent Laid-Open Publication No. 08-72692), in which, when a wheel speed sensor detects that the vehicle wheels are likely to become locked, a driver is informed of this state so as to promote brake releasing operation (i.e., pressure decrease operation of braking force). The brake releasing operation refers to operation in which depression of a brake pedal is eased.

Meanwhile, further art is disclosed for a braking apparatus that controls braking force such that a ratio of a target deceleration with respect to an actual deceleration is within a predetermined range. In the braking apparatus, there are some cases where it is not possible to increase the actual deceleration upto the predetermined range due to functional limitations of a brake booster, if requisite braking force, i.e., the target deceleration is too large. In order to inform the driver of such a condition, an art is disclosed (for example, in Japanese Patent Laid-Open Publication No. 09-254757) that issues a warning in the case where the braking force exceeds a predetermined upper limit value.

Generally speaking, a driver feels a sense of danger when in a state where braking as the driver intends is not being executed; that is, in a case where the vehicle is not decelerating as the driver intends, contrary to the expectation of the driver, even though the driver is depressing a brake pedal. Particularly, in a case where it is not certain whether or not a road surface is frozen, or the like, some drivers feel a sense of fear since they do not know what is happening in the vehicle and why the brake is not acting.

In these cases, if the driver is provided with some information, the driver feels a sense of danger or fear less frequently. Moreover, it is reasonable to assume that if the information provided is in accordance with a degree of how much the actual braking state differs from the driver's braking intention, the driver will feel a sense of danger or fear even more rarely.

The conventional art as disclosed in Japanese Patent Laid-Open Publication No. 08-72692 as above is configured to issue the warning when the wheels are likely to become locked. However, this state in which the wheels are likely to become locked is generated by a depression amount of the brake pedal of the driver, and thus the state is not contrary to the driver's intention. Therefore, the state in which warning is issued is not contrary to the driver's intention.

Further, the art is not able to linearly issue the warning with respect to the degree of difference between the driver's intention and the actual braking state.

Further, the conventional art disclosed in the aforementioned Japanese Patent Laid-Open Publication No. 09-254757 only issues the warning in the case where the braking force that is being generated exceeds a predetermined upper limit value. Accordingly, the art is not able to linearly issue the warning in accordance with the degree of difference between the driver's intention and the actual braking state.

SUMMARY OF THE INVENTION

In view of the foregoing situation, it is an object of the present invention to provide a brake warning apparatus capable of making a driver recognize a degree of difference between the driver's intended braking state and the actual braking state.

A brake warning apparatus according to the present invention issues the warning in accordance with a difference level. The difference level indicates a deviation between a target deceleration which is set based on a brake operation amount and an actual deceleration of a vehicle. Accordingly, in a case where the vehicle does not decelerate despite a braking operation by the driver, the warning is issued in accordance with a degree of difference between the target and actual decelerations. This enables the driver to correctly recognize a magnitude of deceleration with respect to a depression amount of the brake pedal. Further, this enables the driver to recognize that braking as the driver intends cannot be achieved, and thus inhibits the driver from feeling a sense of danger.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
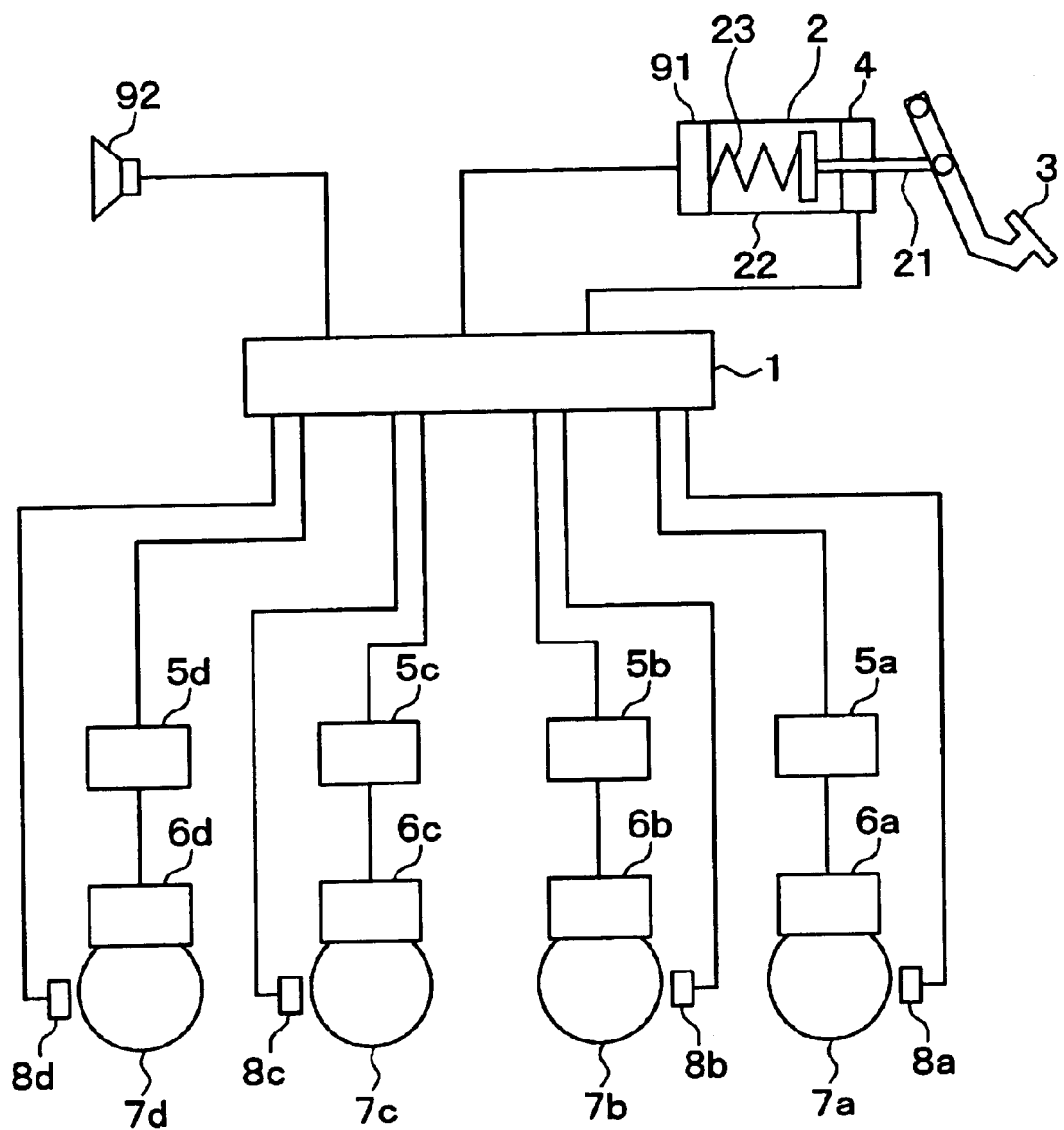
FIG. 1 is a schematical view showing a brake warning apparatus according to a first embodiment of the present invention.

The present invention will be described further with reference to various embodiments in the drawings.
(First Embodiment)

A brake warning apparatus according to a first embodiment of the present invention will be explained in detail referring to the drawings. FIG. 1 is a schematical view showing a brake warning apparatus according to the first embodiment.

A braking control ECU 1 is configured by a computer. A depression force value of a brake pedal 3 that is detected by a depression force sensor 4 is input to the braking control ECU 1 and then calculates a target deceleration of each wheel, i.e., target braking force. Next, using a brake driving circuit 5*a* to 5*d* provided for each wheel, the braking control ECU 1 drives each motor actuator 6*a* to 6*d* in accordance with the target braking force, so as to control brake rotors 7*a* to 7*d* in each wheel.

Further, the braking control ECU 1 also functions as a known anti lock brake (ABS) control apparatus. The braking control ECU 1 calculates a vehicle speed and a slip speed based on a signal from wheel speed sensors 8*a* to 8*d*. The wheel speed sensors 8*a* to 8*d* detect respective rotational speeds of the brake rotors 7*a* to 7*d*, each of which integrally rotates with the respective wheel. Further the braking control ECU 1 controls braking force on each wheel such that the slip speed is within a predetermined range.

Moreover, the braking control ECU 1 constitutes the brake warning apparatus according to the present invention. The braking control ECU 1 calculates a deviation between the target deceleration and the actual deceleration as a difference level, and drives a buzzer 92 and a pedal vibration generator 91 that are warning issuing devices in accordance with this difference level.

Each of the motor actuators 6*a* to 6*d* has a motor and a decelerator for decelerating rotation of the motor and transmitting it to a caliper (now of these members are shown in the figure). Further, the motor actuators 6*a* to 6*d* apply braking force on respective wheels by pressing a friction material to the brake rotors 7*a* to 7*d* using the caliper. Note that the target braking force is achieved by controlling the rotation speed of the motor of each of the motor actuators 6*a* to 6*d* in accordance with a command value from each of the brake driving circuits 5*a* to 5*d*.

A pedal simulator 2 is configured from a piston 21 moved by depression of the brake pedal 3, a cylinder 22 in which the piston 21 slides, and a spring 23 disposed in the cylinder 22.

The brake pedal 3 is connected to the piston 21. Therefore, when the brake pedal 3 is depressed, a reaction force and a stroke, which are caused by spring force of the spring 22 and are in accordance with a pedal operation amount, are applied to the brake pedal 3.

The depression force sensor 4 is provided in the pedal simulator 2 as a brake operation amount detection device. The depression force sensor 4 can detect a pedal depression force as the brake operation amount in accordance with the reaction force of the spring 22.

Further, the pedal vibration generator 91 installed to the pedal simulator 2, and has a motor and an eccentric rotor which is rotated by the motor. Using rotation of the motor and the eccentric rotor, the pedal vibration generator 91 causes vibration to the brake pedal 3 via the pedal simulator 2. Thus, a warning is issued to the driver by the vibration.

Further, the buzzer 92 generates a buzzer sound based on a signal from the braking control ECU 1. Thus, a warning is issued to the driver in the form of a sound.

The pedal vibration generator 91 and the buzzer 92 correspond to the warning issuing device of the present invention.

Note that, the brake warning apparatus the first embodiment includes an ABS control apparatus using an electric motor brake (EMB), as a brake-by-wire system.

Figure 2:
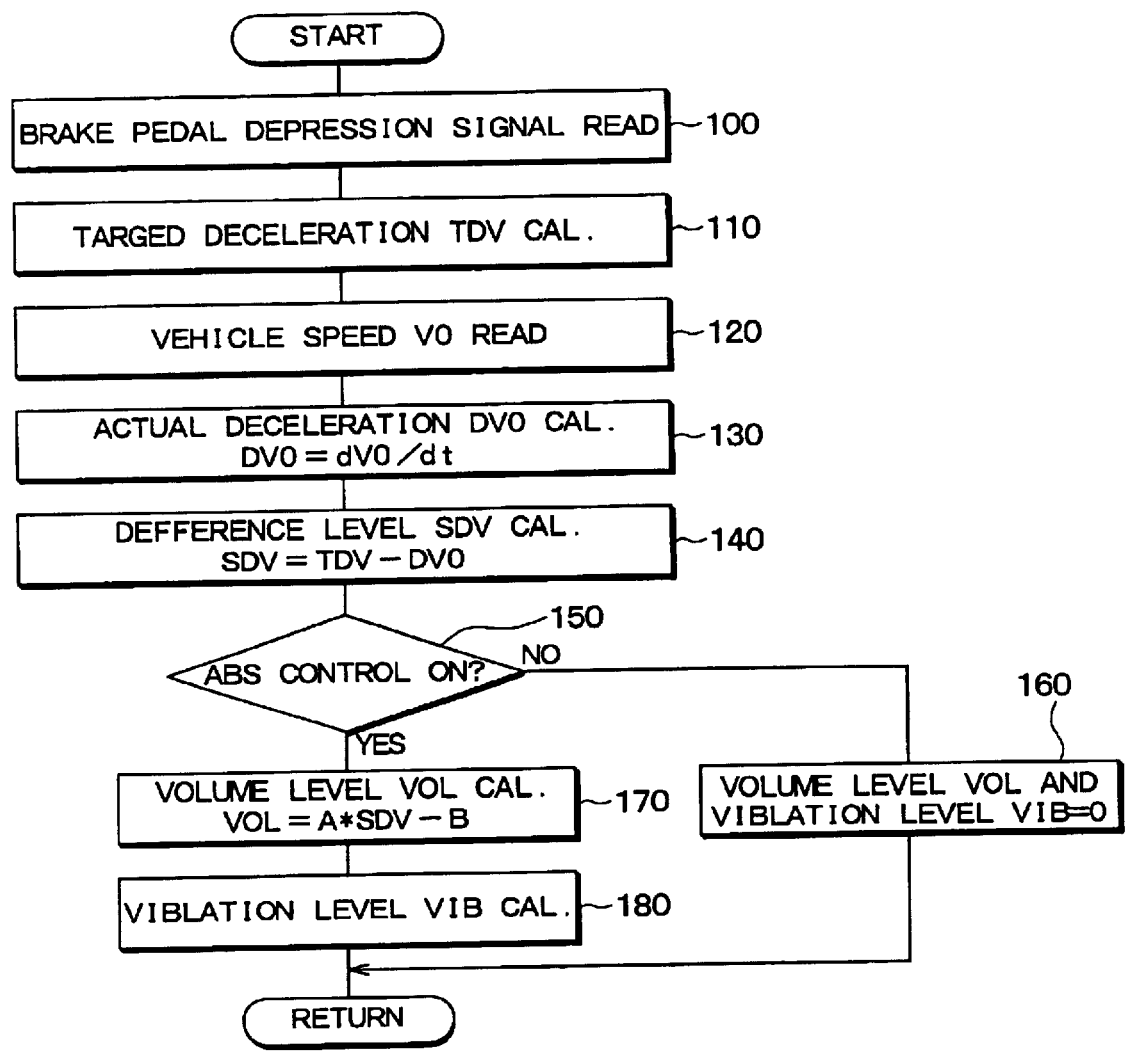
FIG. 2 is a flow chart of brake warning processing executed by the brake warning apparatus according to the first embodiment.

The flow chart in FIG. 2 shows an operational flow executed by the braking control ECU 1 so as to act as the brake warning apparatus according to the first embodiment. The braking control ECU 1 is also operated as the ABS control apparatus as described above. However, since the operation thereof is executed in accordance with a known procedure, an explanation of the procedure will be omitted.

Note that, when the braking control ECU 1 starts the ABS control, it turns on a flag indicating that the ABS control has started. Based on this flag, it is possible to determine whether or not the ABS control is being executed.

The processing in this flow chart is started immediately after the ignition is turned on, and is repeatedly executed with a predetermined braking cycle (for example, 5 to 10 ms).

At 100, a brake pedal depression force signal from the depression force sensor 4 is read as the pedal operation amount.

Figure 3:
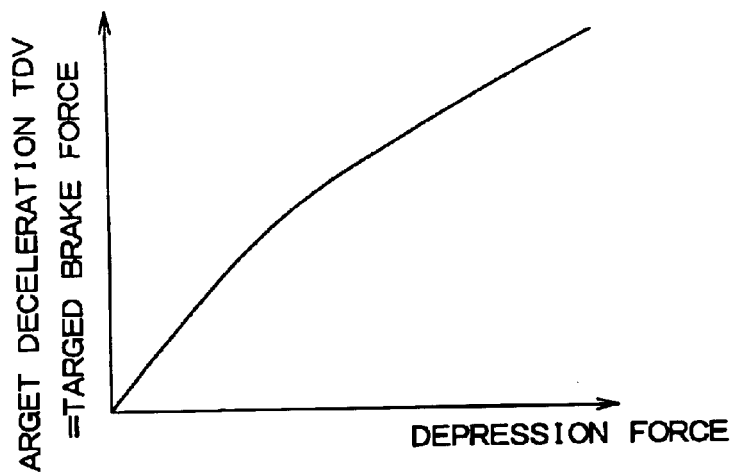
FIG. 3 is a diagram showing a relationship between a depression force and a target deceleration.

At 110, based on the depression force value that has been read, a target deceleration TDV is computed. As shown in FIG. 3, the relationship of the target deceleration TDV and the depression force value have been determined in advance. Specifically, the target deceleration TDV is preset so as to change in a substantial linear manner with respect to the depression force value. That is, in a low depression force region, the target deceleration, i.e., the target braking force, is set to be larger due to the effect of a brake booster. The processing at 110 corresponds to a target deceleration calculation device of the present invention.

Next, a vehicle speed V0 is read at 120. The vehicle speed V0 is a physical amount that is used when calculating the slip speed during the ABS control. The vehicle speed V0 is set by selecting the highest wheel speed among those of the four wheels. The processing at 120 corresponds to a vehicle speed detection device of the present invention.

At 130, an actual deceleration DV0 is computed by differentiating the vehicle speed V0 (DV0=d (V0)/dt). The processing at 130 corresponds to an actual deceleration calculation device of the present invention.

At 140, a difference level SDV between the target deceleration and the actual deceleration is computed using the formula SDV=TDV−DV0. The processing at 140 corresponds to a difference level calculation device of the present invention.

Next, at 150, the braking control ECU 1 determines whether or not the flag indicating that the ABS control is being executed is on.

If the ABS control is not being executed, the routine proceeds to processing at 160, and sets both a sound volume level VOL of the buzzer 92 and a vibration level VIB of the pedal vibration generator 91 at zero.

Figure 4:
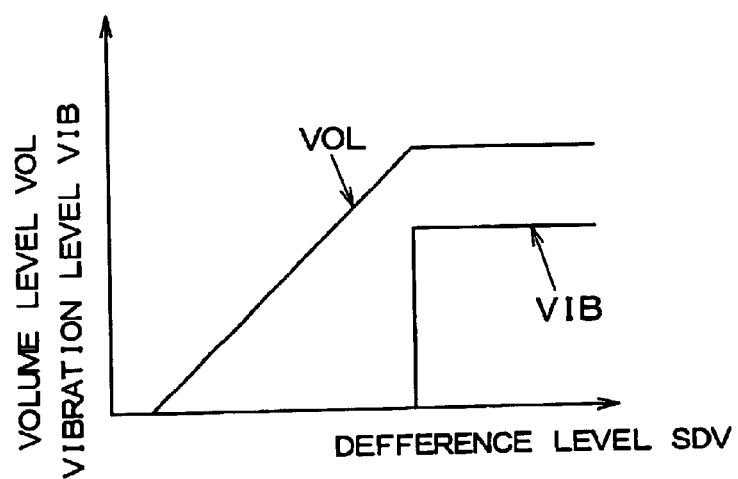
FIG. 4 is a diagram showing a relationship between a difference level and a buzzer sound volume level and a relationship between the difference level and a pedal vibration level.

On the other hand, if the ABS control is being executed, the processing is executed based on a diagram shown in FIG. 4. Meanwhile, FIG. 4 shows a relationship between the difference level SDV and the sound volume level VOL, and also a relationship between the difference level SDV and the vibration level VIB. The sound volume level VOL of the buzzer 92 is calculated at 170, and the pedal vibration level VIB is calculated at 180.

In FIG. 4, the buzzer volume level VOL is set such that in the case where the difference level SDV is less than the predetermined value, it has a relationship with respect to the difference level SDV. That is expressed by the formula VOL=A*SDV−B (A, B: constants) and is set at a fixed value when the difference level has reached or exceeds the predetermined value. When the difference level is small the buzzer volume level VOL is set at zero, since the necessity for issuing a warning to the driver is small.

The pedal vibration level VIB in the first embodiment is set at a fixed vibration level in the case where the difference level is relatively large, such that the aforementioned sound volume level VOL becomes the predetermined value.

Moreover, in the processing at 170 and S180, when the sound volume level VOL and the pedal vibration level VIB are set, the brake control ECU 1 outputs a signal indicating this fact that these levels have been set.

Therefore, the buzzer 92 issues, as warning, a buzzer sound having a volume which changes in accordance with the difference level SDV. Further, the pedal vibration generator 91 transmits vibration which has a fixed value when the difference level has reached or exceeds a predetermined value, via the brake pedal 3 to the driver. This enhances a driver warning effect.

As described above, the brake warning apparatus of the first embodiment calculates the target deceleration based on the depression force indicated by the driver's brake operation amount, and sets the target deceleration as an indicator of the driver's braking intention. On the other hand, the brake warning apparatus differentiates the actual vehicle speed to calculate the actual deceleration, and sets a deviation between the target deceleration and the actual deceleration as the difference level indicating a degree of difference between the driver's braking intention and the actual braking state.

Moreover, the buzzer 92 generates a sound with a volume that increases in accordance with the magnitude of the difference level. Therefore, the driver can correctly recognize the degree of difference of the actual braking state from the driver's braking intention judging from the sound volume of the buzzer 92 and the vibration of the pedal vibration generator 91. Accordingly, since the driver is able to recognize that the brake is not acting, contrary to the driver's intention, the driver feels a sense of danger or fear less frequently.

When driving a vehicle with a hydraulic braking apparatus, even if locking of the wheels is generated on a frozen road surface despite the ABS control, the driver can recognize what is happening to the vehicle from the vibration and the sound which are generated in hydraulic piping while the ABS control is being executed. Therefore, the driver does not feel a sense of danger or fear.

As compared to a vehicle with a hydraulic braking apparatus, a brake-by-wire vehicle with an electric motor braking apparatus does not generate a vibration in the hydraulic piping while the ABS control is being executed. Therefore, it is effective to provide the driver with a warning using sound or vibration in accordance with the degree of difference between the driver's braking intention and the actual braking state, as in this first embodiment.

Further, in the first embodiment, calculation results obtained from an ordinary ABS control apparatus can be utilized to find the vehicle speed necessary for calculating the difference level. This eliminates the necessity of having a wheel speed sensor that is exclusively dedicated to the brake warning apparatus, thereby simplifying the system.

(Modifications)

Various modifications of the first embodiment are possible, as follows:

(a) In the first embodiment, an example is illustrated in which the buzzer 92, as the warning issuing device, generates a buzzer sound having a volume that changes magnitude in accordance with the difference level. However, the present invention is not limited to this, and instead, the pitch of the sound, i.e., frequency, may be changed. For example, frequency may increase as the difference level increases. Alternatively, the buzzer sound may be changed cyclically, and the cycle may be set such that it decreases as the difference level increases.

Alternatively, the sound volume, the frequency, and the cycle of the buzzer sound may be combined in an appropriate manner, and each of them may be changed in accordance with the difference level.

(b) In the first embodiment, an example is illustrated in which the pedal vibration generator 91, as the warning issuing device, generates a fixed vibration when the difference level has reached or exceeds a predetermined difference level. However, the present invention is not limited to this. Instead, as in the case of the aforementioned modification (a), each of the magnitude, the number, and the generation cycle of the vibration maybe changed in accordance with the difference level. Note that, other than in the brake pedal 3, vibration may be generated in a steering wheel, a seat back, a seat surface, or the like, that are in contact with the driver.

(c) In the first embodiment, an example is illustrated in which the results calculated by the ABS control apparatus, as the warning issuing device, are input to the brake control ECU 1. However, the present invention is not limited to this, and instead, an output from a linear acceleration sensor installed in a traction control apparatus, a vehicle stability control apparatus or the like can be used. In this case, the vehicle speed may be obtained by integrating the output from the linear acceleration sensor.

Moreover, the output from the linear acceleration sensor itself can be used as the actual deceleration. In this case, although the sensor output includes an error caused by a road surface inclination component, the necessity for the vehicle speed detection device is eliminated.

(d) In the first embodiment, an example is illustrated in which, the electric motor brake (EMB) apparatus is used as the brake-by-wire system. However, as well as this, if an electric hydraulic brake (EHB) apparatus is adopted, the driver is able to recognize the degree of difference between the driver's braking intention and the actual braking state. Further, this modification inhibits the driver from feeling a sense of danger or fear.

While the above description is of the preferred embodiments of the present invention, it should be appreciated that the invention may be modified, altered, or varied without deviating from the scope and fair meaning of the following claims.

What is claimed is:

1. A vehicular brake warning apparatus comprising:
   a brake operation amount detection device for detecting a brake operation amount operated by a driver;
   a target deceleration computation device for computing a target deceleration of a vehicle in accordance with the brake operation amount;
   an actual deceleration calculation device for calculating an actual deceleration of the vehicle;
   a difference level calculation device for calculating, as the difference level, a deviation between the target deceleration and the actual deceleration; and
   a warning issuing device for issuing warning in accordance with the difference level.

2. The vehicular brake warning apparatus according to claim 1, wherein the warning issuing device generates a warning sound with a sound volume in accordance with the difference level.

3. The vehicular brake warning apparatus according to claim 1, wherein the warning issuing device generates a warning sound having a sound volume that changes in a cycle in accordance with the difference level.

4. The vehicular brake warning apparatus according to claim 1, wherein the warning issuing device generates a warning sound with a pitch in accordance with the difference level.

5. The vehicular brake warning apparatus according to claim 1, wherein the warning issuing device causes the driver to sense a vibration in accordance with the difference level.

6. The vehicular brake warning apparatus according to claim 1, further comprising:

a vehicle speed detection device for detecting the vehicle speed, wherein the deceleration calculation device obtains the actual deceleration of the vehicle based on the vehicle speed detected by the vehicle speed detection device.

7. The vehicular brake warning apparatus according to claim 6, further comprising:

an anti lock brake control apparatus preventing locking of wheels, wherein the vehicle speed detection device detects the vehicle speed by receiving the vehicle speed from the anti lock brake control apparatus.

* * * * *